(12) United States Patent
Mann et al.

(10) Patent No.: US 7,343,077 B2
(45) Date of Patent: Mar. 11, 2008

(54) FIBER OPTIC DROP WIRE SPLICE KIT

(75) Inventors: William H. Mann, Contoocook, NH (US); John K. Burnham, Exeter, NH (US); Michael H. Bubak, Highland Village, TX (US); Pamela K. LaRoche, Barnstead, NH (US); Kevin D. Scott, Rochester, NH (US); Duston W. Shost, Goffstown, NH (US); Joseph E. Bradley, Newfields, NH (US); James J. Decknick, Goffstown, NH (US)

(73) Assignee: Uraseal, Inc., Dover, NH (US)

( * ) Notice: Subject to any disclaimer, the term of this patent is extended or adjusted under 35 U.S.C. 154(b) by 0 days.

(21) Appl. No.: 11/397,344

(22) Filed: Apr. 4, 2006

(65) Prior Publication Data

US 2006/0233508 A1 Oct. 19, 2006

Related U.S. Application Data

(60) Provisional application No. 60/668,462, filed on Apr. 5, 2005.

(51) Int. Cl.
*G02B 6/255* (2006.01)
*G02B 6/00* (2006.01)

(52) U.S. Cl. .......................... 385/135; 385/95; 385/99

(58) Field of Classification Search ............ 385/95–99, 385/134–137, 147
See application file for complete search history.

(56) References Cited

U.S. PATENT DOCUMENTS

| 4,820,007 | A | * | 4/1989 | Ross et al. ................. 385/135 |
| 4,875,952 | A | * | 10/1989 | Mullin et al. ................. 156/48 |
| 5,434,945 | A | * | 7/1995 | Burek et al. ................. 385/135 |
| 5,825,963 | A | * | 10/1998 | Burgett ....................... 385/135 |
| 6,546,180 | B1 | * | 4/2003 | Koyano et al. ............. 385/135 |

* cited by examiner

*Primary Examiner*—Kevin S. Wood
*Assistant Examiner*—John M Bedtelyon
(74) *Attorney, Agent, or Firm*—Bourque & Associates

(57) ABSTRACT

The present invention features a system and method for securely holding a fiber optic drop cable splice in place and for creating a watertight splice by encapsulating two or more fiber optic cables having one or more spliced fiber optic strands in an enclosure with an encapsulant to create a permanent, watertight fiber-optic splicing system and method.

14 Claims, 4 Drawing Sheets

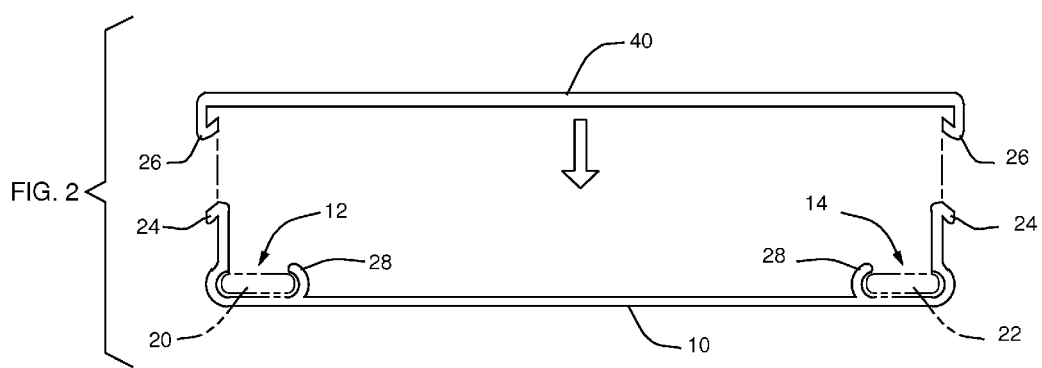
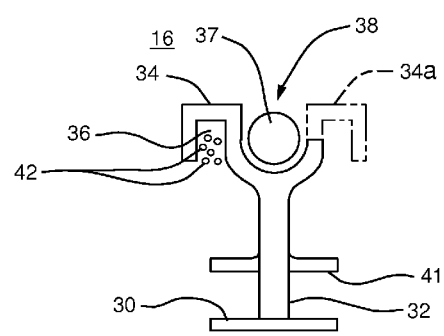
FIG. 3

FIBER OPTIC DROP WIRE SPLICE KIT

CROSS-REFERENCE TO RELATED APPLICATIONS

This application is related to and claims the benefit of U.S. Provisional Patent Application No. 60/668,462 entitled Fiber Optic Drop Wire Splice Kit, filed on Apr. 5, 2005 and fully incorporated herein by reference.

TECHNICAL FIELD

This invention relates to the splicing of fiber optic cables but more particularly, to a system and method for facilitating flat drop cable to be spliced and protected in an enclosure which is generally filled with an encapsulating material.

BACKGROUND INFORMATION

Fiber optic based communication systems are becoming more and more prevalent. Because of its ease of use and wide bandwidth, more and more companies who provide data, video communications and telephone services are installing fiber-optic networks. Once fiber-optic cable is placed along the street or in a building, the providers of the service must still install a fiber-optic cable from the main fiber distribution point to the premises of use. This is often termed the final section of an optical network.

Often times, the fiber-optic cable which comprises the final section of an optical network is installed in an underground conduit, direct buried underground or in an aerial installation. However, because this final section is installed in and around an inhabited premises, the fiber-optic cable can become damaged or broken because of construction, tree limbs, accident, weather damage and the like. Replacing the fiber-optic drop cable running from the network to the premises can be expensive and time-consuming. In this instance the preferred method of dealing with this situation is to splice the broken fiber-optic cable back together. In addition, there are other situations in which it is desirable to splice fiber optic cables together such as in manholes, pedestals and other situations or locations where fiber optic cable is to be spliced into other types of connections or other fiber-optic connections.

Although there are a number of techniques available for splicing together broken fiber-optic cables, such as the end to end fusion splice, the new flat drop cables which are utilized by service providers between the optical network and the premises presents several unique problems. First of all, the flat drop cables presently being used include one or more optical fibers which must be spliced back together. In addition, the splice must be made water and weather proof so as to be able to withstand installation underground or overhead.

Presently, no economical and reasonable method exists to provide such a result. Accordingly, the present invention provides a novel enclosure and method by which a flat, fiber-optic drop cable having, for example, one or two embedded fibers, may be spliced back together and held securely in place in a watertight, weather proof relatively rigid enclosure.

SUMMARY OF THE INVENTION

The invention features an enclosure and method for encapsulating a flat cable such as a flat fiber optic cable often referred to as a fiber optic drop cable or simply a cable. A fiber optic splice kit in accordance with the present invention includes a fiber cable splice enclosure having a top cover portion and a bottom portion. The bottom portion includes at least two cable engagement regions, for engaging the two cables to be spliced. Typically, each cable to be spliced includes at least one strand of glass fiber to be spliced. In the preferred embodiment, each cable frictionally or snap fit engages with the cable engagement region. The bottom portion further includes at least one spliced fiber cradle, for holding and supporting the spliced strands from the two spliced cables.

In the preferred embodiment, the top cover portion frictionally engages with the bottom portion while the first and second cables include fiber-optic wires. The kit further includes end seals for generally sealing the end portions of the enclosure. The end seals may include inserts which fit inside the first and second top and bottom portions. The inserts may include regions sized to fit in one or more cable engagement regions, for forming a seal in the end region of the enclosure. The seal may also include a cap which frictionally engages with the exterior of the enclosure proximate the side end region of the top and bottom portions.

The fiber cable splice kit further includes an encapsulating compound which has a viscosity in an initial range allowing it to be poured into the enclosure wall subsequently hardening to protect the splice. The encapsulating compound may include a two component compound.

Another feature of the present invention is a method for encapsulating a fiber splice. The fiber splice is formed between at least first and second cables each of which includes at least one strand of fiber. The method includes the act of providing a splice enclosure including a top cover portion and a bottom portion. The bottom portion includes at least two cable engagement regions, for engaging with at least two cables to be spliced. Typically, each cable to be spliced includes at least one fiber strand to be spliced. In the preferred embodiment, each cable frictionally or snap fit engages with the cable engagement region. The bottom portion further includes at least one spliced fiber cradle or slack fence, for holding and supporting the spliced fibers from the first and second cables.

Next, the fibers to be spliced are spliced together followed by their insertion into the at least one fiber slack fence. Subsequently, the top cover portion of the enclosure is placed onto the bottom portion forming a central, generally open region of the enclosure. The central generally open region of the enclosure is next filled with an encapsulating compound initially having a viscosity sufficient to allow it to be poured into the enclosure but subsequently hardening.

In the preferred embodiment, the method includes stripping of at least one fiber from the first and second cables prior to their being spliced. Also the preferred embodiment, the fiber optic drop cables includes one or more optical fibers.

It is important to note that the present invention is not intended to be limited to a system or method which must satisfy one or more of any stated objects or features of the invention. It is also important to note that the present invention is not limited to the preferred, exemplary, or primary embodiment(s) described herein.

BRIEF DESCRIPTION OF THE DRAWINGS

These and other features and advantages of the present invention will be better understood by reading the following detailed description, taken together with the drawings wherein:

FIG. 2 is a schematic view of an enclosure bottom and top cover in accordance with one of the teachings of the present invention;

FIG. 3 is a schematic in view of a support or fence used in the enclosure of the present invention;

DESCRIPTION OF THE PREFERRED EMBODIMENT OF THE INVENTION

The present invention features a system and method for securely holding a fiber-optic drop cable splice in position in a watertight enclosure. The present invention is particularly applicable to flat drop fiber-optic cable such as mini DP flat drop cable available from OFS Optics, although this is not a limitation of the present invention.

Figure 1:
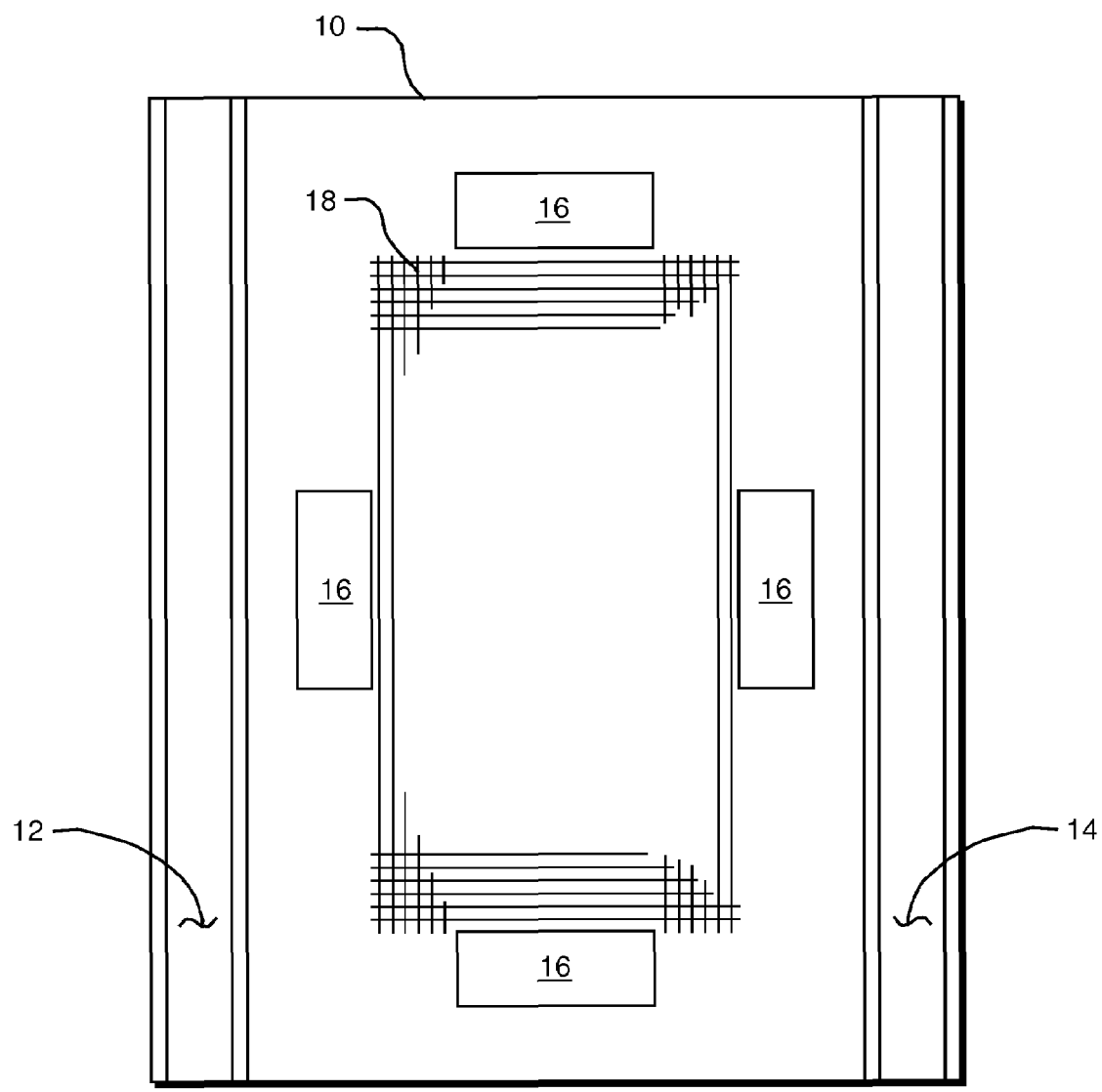
FIG. 1 is a schematic perspective view of an enclosure in accordance with the present invention and which is used to practice the method of the present invention.

The present invention features a two-piece plastic enclosure including a bottom portion 10, FIG. 1. The bottom portion 10 of the enclosure includes long cable engagement regions 12 and 14 proximate the edges of the bottom portion 10 which serve to hold the flat cable, as will be explained in greater detail below and sometimes referred to herein as slots or troughs. Proximate the central region of the bottom portion 10 of the enclosure is located one or more fences or cradles 16 (also referred to herein as fence, support or slack fence). As will be explained in greater detail below, the slack fences 16 serve several functions. The first is to securely hold a fiber-optic cable fusion splice. The slack fences 16 also serve to contain the coiled and stripped fiber-optic strands in the interior of the slack fences, as will also be explained in greater detail below. Lastly, the slack fences also serve to prevent the cable tracer wire from intermingling with the exposed optical fibers as will be further explained below.

Located between the slack fences 16 is a fiber support device such as a piece of material 18 in the form of a foam pad or screen. This material keeps the fiber optic strands which are coiled on top of it from being pushed down to the bottom of the enclosure, allowing the fiber optic strands to become encapsulated within the encapsulating compound added to the enclosure when the splice is concluded and the enclosure is to be sealed. Other support devices are contemplated by this invention.

As shown in greater detail in FIG. 2, the bottom portion 10 of the enclosure includes first and second longitudinally extending slots or troughs 12 and 14 into which may be snapped in place flat fiber optic drop cables 20 Or. 22. The troughs or slots 12 and 14 include proximate their outer edge and upwardly facing protrusion 24 which serves to engage with protrusions 26 on enclosure cover 40 to allow the cover 40 to "snap" in place over the base 10. A set of inward protrusions 28 help form the troughs 12 and 14 to reasonably securely hold the flat fiber optic cables 20, 22 in place.

In the preferred embodiment, the base 10 and cover 40 will be made of a cold proof, flexible, crack proof PVC or other suitable material. The base 10 and the cover 40 will be extruded although other manufacturing techniques may be utilized and are within the skill in the art. In addition, the preferred embodiment contemplates that the troughs or channels 12, 14 may be extruded with a softer or more resilient material lining at least the interior region of the trough or channel in order to form a better seal between the fiber-optic flat drop cable 20, 22 in the trough or channel 12, 14.

A support slack fence 16 is shown in greater detail in FIG. 3 and includes a base portion 32 to which is attached an upright vertical portion 32 extending generally vertically from the base 30 and supporting a support region 34. The support region 34 may be oriented as shown at 34 or 34a depending on the orientation of the support slack fence 16 to insure that the open region or overhang 36 in the support region 34 will extend towards the central region of the enclosure. The support or fence 16 may also include a horizontal shelf or trough 41 which can serve to hold the tracer wire and prevent the tracer wire from intermingling with the fiber optic wire coil.

The support region 34 includes a central channel 38 which serves to hold a fusion splice 37 in the fiber-optic cable. Presently, one of the most preferred methods of splicing a fiber-optic cable is known as an end-to-end fusion splice which, as is well known in the art, is formed by first sliding a clear plastic piece having a steel spine over one of the cable strands. Subsequently, the fiber optic strands to be spliced are placed end-to-end and the fiber strands are fused together using a splicing device. The clear plastic piece is then positioned over the fusion splice and heat shrunk over the fusion splice. The steel shank or spine serves to maintain the alignment of the ends of the abutted fiber optic strands. This fusion splice 37 is snapped into place into the groove or channel 36 in slack fence 16, thus securely holding the splice. The overhang region 36 of the slack fence 16 provides a top vertical surface to contain the multiple fiber optic strands 42 which are coiled within the enclosure preventing the strands from springing up out of their coiled position.

Figure 4:
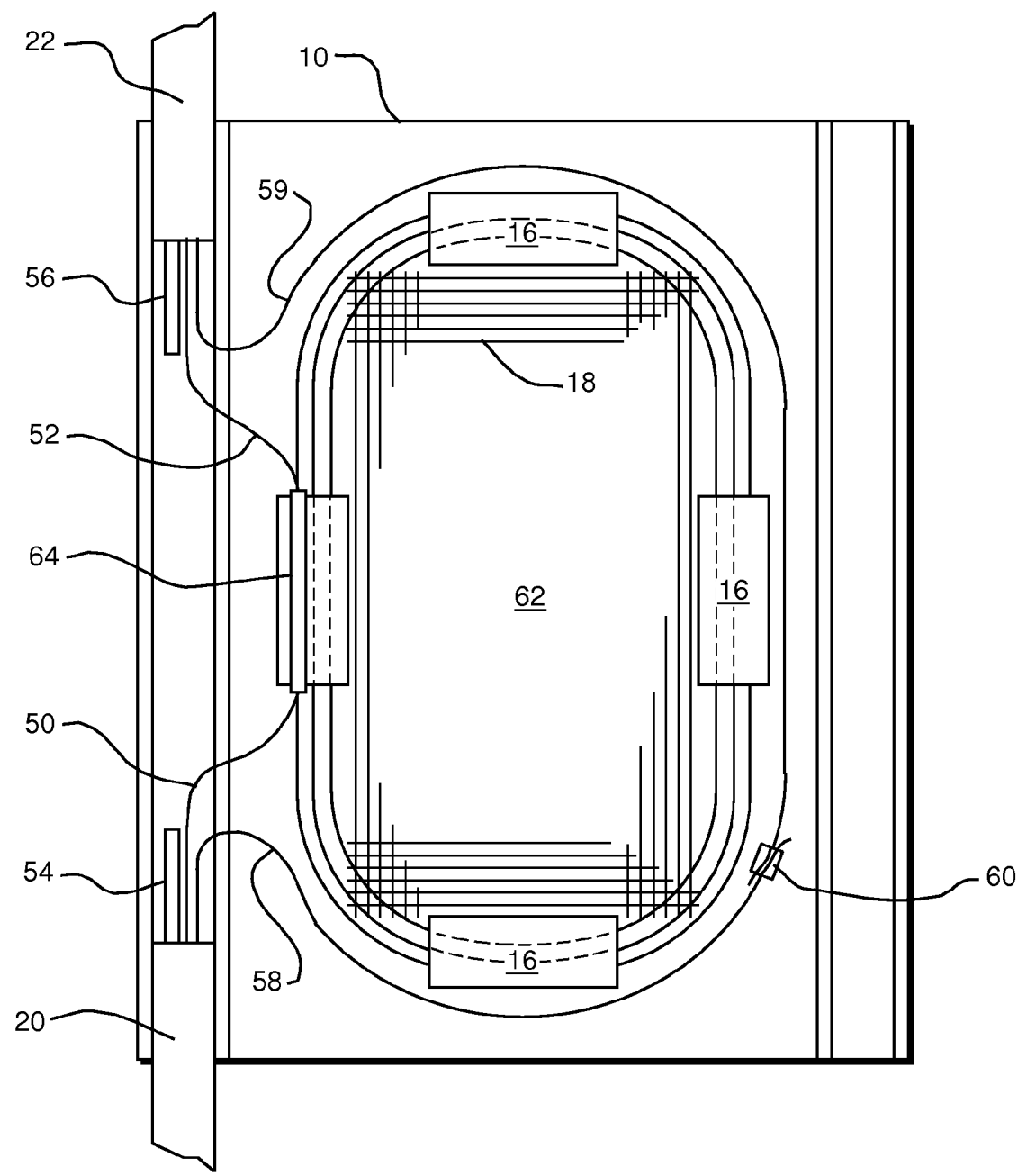
FIG. 4 is a schematic plan view of an enclosure in accordance with the present invention in which is mounted two, spliced fiber-optic cables.

The enclosure of the present invention and the method for its use is shown in greater detail in FIG. 4. The first step in splicing together two fiber-optic cables is to strip the ends of the fiber-optic cables 20, 22 exposing one or more fibers 50, 52, at least one fiber optic strand from each of the cables 20, 22; a strength member 54, 56 from each fiber-optic cable; and, if provided, a tracer wire 58, 59 from each fiber optic cable.

The strength members 54, 56 provide strength to the fiber optic cables 20, 22 in the longitudinal direction preventing the cable from stretching and breaking the fiber-optic cable. In accordance with the present invention, approximately 1 inch of the strength members 54, 56 are exposed and when encapsulated in the encapsulating compound which will later fill the enclosure, help prevent the fiber-optic cables 20, 22 from moving due to someone pulling on the cable or due to normal thermal expansion and contraction thus providing excellent "pullout strength" for the fiber-optic cables.

If provided in the fiber-optic cables 20, 22, tracer wires 58, 59 allow the cable to be located if buried underground. The tracer wires 58, 59 are wound on the outside of the fences 16 and "clipped" together 60 to provide one continuous conductive path through the tracer wires. The tracer wires may be placed on horizontal shelves 41, if provided, on the fence 16.

Several inches to several feet of fiber optic cable 50, 52 may be stripped prior to being fused together in a fusion or other type of splice. All of the excess fiber optic cable strands will be coiled in the interior region 62 of the base 10 of the enclosure against one or more fences 16. The enclosure is sized such that the coiled fiber optic strands forms a coil of no less than 3 inches in diameter to maintain signal integrity in the fiber optic cables. In order to facilitate coiling of the fiber optic strands the coil may first be made against one slack fence 16. Subsequently, one a more other fences may be added. A fiber diameter of no more than three inches is maintained, being careful not to exceed the three inch diameter especially in the regions between the slack fences and the corners of the enclosure. Coils with bulges in this region will be prone to signal loss. The pad or screen 18 may be sized to fit within the fences 16. Alternatively, the pad or screen 18 may include cutout regions into which the slack fences 16 are placed and glued or otherwise fastened to the base 10. Ultimately, the fusion splice 64 will be snapped in place in the groove or channel of one of the slack fences 16.

Figure 5:
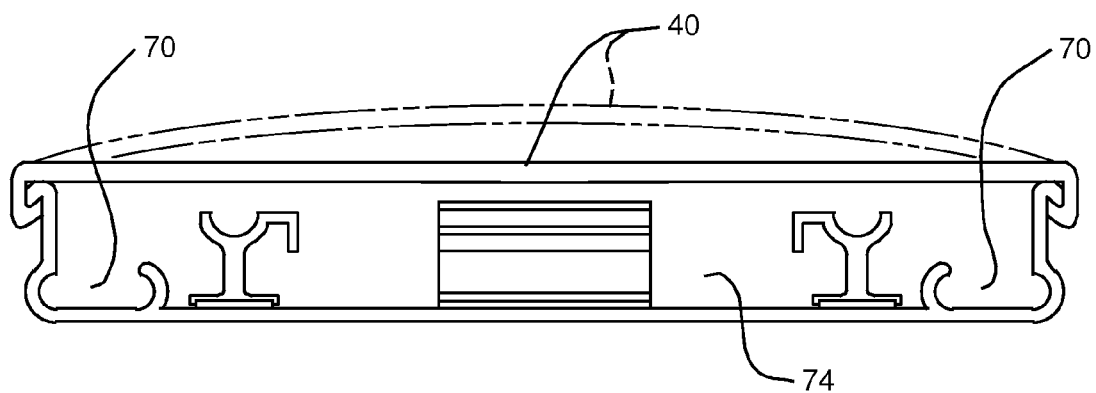
FIG. 5 is a schematic and review of an enclosure in accordance with the present invention.
Figure 6:
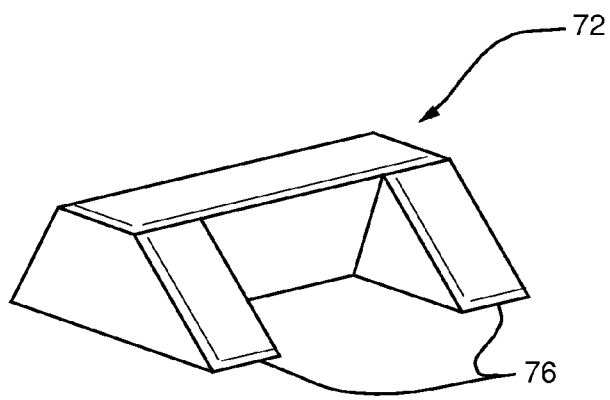
FIG. 6 is a schematic plan view of an insert for sealing the end region of an enclosure.

Once all of the splices have been made and all of the fiber optic strands coiled, the cover 40 is snapped in place over the spliced and coiled fiber optic cables, FIG. 5 (shown for sake of clarity without cables or fibers.). The cover 40 may be made generally flat or with an upward bow. Any open regions and unused fiber-optic cable slots in the base 70 are plugged using either short pieces of dummy fiber optic cables, in the case of unused slots, foam pieces or other suitable material.

Figure 7:
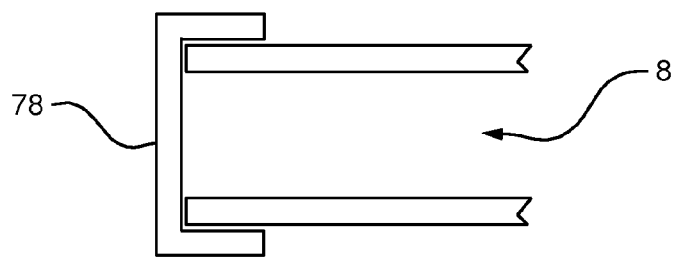
FIG. 7 is a partial cross-sectional view of an enclosure showing a cap seal for the end region.

For example, a pre-cut foam, molded plastic or rubber, or other suitable insert 72 may be provided to seal the open end region 74 of the enclosure. The insert 72 will preferably include two "legs" 76 which are dimensioned to fit into the fiber-optic cable slots 70 in the enclosure, thereby preventing the encapsulating compound from running out of the enclosure until such time as the compound solidifies. In yet another similar embodiment, the enclosure 8, FIG. 7, may be provided with a soft rubber or vinyl end cover 78 which fits relatively tightly over the top and bottom covers and thereby seals the end regions. The cables will pass through the end cover through an opening that frictionally engages around the cable thereby preventing the encapsulant from leaking out of the enclosure.

Typically, it is presently envisioned that the enclosure will be filled with an encapsulating compound in a vertical position. Thus, one "end" 74 of the enclosure will be sealed, as previously described above with an insert or the like, while the other and will be held upright. An encapsulating material such as a two component urethane encapsulant having a low enough viscosity to flow into the enclosure and cure in a relatively short time of approximately 2 to 5 minutes is poured into the enclosure. The encapsulant does not expand that is, it has a low co-efficient of expansion. The cover 40 of the enclosure is preferably made of a clear of material so that the encapsulant can be seen in the enclosure and any air bubbles squeezed out. Once the encapsulant has cured, the enclosure may be placed in a horizontal position. In another embodiment, both ends 74 of the enclosure may be sealed and the cover may be provided with a hole which is used to fill the enclosure with encapsulant in a horizontal position. Although the present drawings illustrate fiber-optic cable's 20, 22 inserted in opposite ends of the same cable slot, this is not a limitation of the present invention as the fiber optic cables may be inserted in any one of the four provided positions.

It is important to note that the present invention is not intended to be limited to a system or method which must satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by the allowed claims and any legal equivalents thereto.

We claim:

1. A fiber optic drop cable splice kit, comprising:

a fiber cable splice enclosure adapted to be filled with an encapsulating compound, said enclosure having a top cover portion and a bottom portion, said enclosure including a first open end region and a second open end region disposed on an opposite end of said enclosure from said first end region, said bottom portion including a first surface having a first longitudinal edge region and a second longitudinal edge region, said second longitudinal end region disposed on an opposite side of said first surface from said first longitudinal edge region;

said first longitudinal edge region including at least a first cable engagement region and said second longitudinal edge region including at least a second cable engagement region, each of said first and second cable engagement regions forming a three-sided fiber optic drop cable engagement region having an opening with a width that is less than a width of said fiber optic drop cable, said three-sided fiber optic drop cable engagement region configured for directly, frictionally engaging with and retaining at least first and second fiber optic drop cables, each said first and second fiber optic drop cable including at least one fiber strand to be spliced;

at least one spliced fiber cradle or slack fence, for holding and supporting at least the spliced first and second fibers, said at least one spliced fiber cradle including a first region configured for engaging with a fiber splice region of said spliced first and second fibers, and a second region for engaging with one or more un-spliced region of said at least first and second fibers, said cradle configured for holding and supporting at least the splice region of said first and second fibers and the un-spliced region of said at least first and second fibers a spaced distance away from said first surface of said bottom portion, for allowing said encapsulating compound to flow around and directly contact said at least first and second spliced fibers and said at least one spliced fiber cradle or slack fence;

an encapsulating compound having an initial viscosity configured to allow said encapsulating compound to be fluidly introduced into and flow generally throughout said enclosure and said at least first and second spliced fibers and said at least one spliced fiber cradle or slack fence, and a final viscosity forming a generally hardened encapsulation of said at least first and second spliced fibers.

2. The fiber cable splice kit of claim 1 wherein said top portion frictionally engages with said bottom portion.

3. The fiber cable splice kit of claim 1 wherein said first and second cables include fiber optic strands.

4. The fiber cable splice kit of claim 1 further including first and second seals, configured for sealing said first open end region and a second open end region formed by said top cover portion engaged with said bottom portion.

5. The fiber cable splice kit of claim 4 wherein said seal includes an insert seal between said top cover portion and said bottom portion.

6. The fiber cable splice kit of claim 5 wherein said insert seal includes at least one protrusion for sealing at least one of said first and second cable engagement regions proximate one end of said bottom portion.

7. The fiber cable splice kit of claim 4 wherein said seal includes an external cap which engages an exterior region of said top cover portion and said bottom portion proximate said first and second open end regions.

8. The fiber cable splice kit of claim 1 wherein said bottom portion includes four fiber cable engagement regions.

9. The fiber cable splice kit of claim 1 wherein said bottom portion includes at least two spliced fiber cradles.

10. The fiber optic splice kit of claim 1, wherein said at least one spliced fiber cradle further includes a third region configured for holding a tracer wire included with at least one of said first and second fiber optic drop cables.

11. A method of enclosing a fiber cable splice between first and second cables, each of the first and second cables including at least one fiber strand, the method comprising the acts of:

providing a fiber cable splice enclosure, said fiber cable splice enclosure having a top cover portion and a bottom portion a fiber cable splice enclosure having a top cover portion and a bottom portion, said enclosure including a first open end region and a second open end region disposed on an opposite end of said enclosure from said first end region, said bottom portion including a first surface having a first longitudinal edge region and a second longitudinal edge region, said second longitudinal end region disposed on an opposite side of said first surface from said first longitudinal edge region;

said first longitudinal edge region including at least a first cable engagement region and said second longitudinal edge region including at least a second cable engagement region, each of said first and second cable engagement regions forming a three-sided fiber optic cable engagement region having an opening with a width that is less than a width of said fiber optic cable, said three-sided fiber optic cable engagement region configured for directly, frictionally engaging with and retaining at least first and second fiber optic cables, each said first and second fiber optic cable including at least one fiber strand to be spliced; and at least one spliced fiber cradle, for holding and supporting the spliced first and second fiber strands, said at least one spliced fiber cradle including a first region configured for engaging with a fiber splice region of said spliced first and second fibers, and a second region for engaging with one or more un-spliced region of said at least first and second fibers, said cradle configured for holding and supporting at least the splice region of said first and second fibers and the un-spliced region of said at least first and second fibers a spaced distance away from said first surface of said bottom portion, for allowing said encapsulating compound to flow around and directly contact said at least first and second spliced fibers and said at least one spliced fiber cradle;

splicing said at least a first strand of said first cable to said at least a first strand of said second cable forming a splice region of said at least a first strand from said first and second cables;

inserting said splice region of said at least a first strand from said first and second cables into said first region of said at least one spliced fiber cradle;

inserting said one or more un-spliced region of said at least a first strand from said first and second cables into said second region of said at least one spliced fiber cradle;

placing said top cover portion of said enclosure on to said bottom portion, forming a central generally open region of said enclosure including at least an end region of said first and second cables and said spliced fiber strands; and generally filling said central generally open region of said enclosure with an encapsulating compound, said encapsulating compound having an initial viscosity allowing it to be poured into said enclosure to directly contact said at least first and second spliced fibers and said at least one spliced fiber cradle but subsequently solidifying, forming a generally hardened encapsulation of said spliced and un-spliced regions of said at least a first strand from said first and second cables.

12. The method of claim 11 further including before the act of splicing said at least a first fiber strand of said first cable to said at least a first fiber strand of said second cable, the act of stripping the one end of said at least one fiber cable of said first cable and stripping at least one end of said at least one fiber cable from said second cable.

13. The method of claim 11 further including before the act of generally filling said central open region with an encapsulating compound, the act of inserting at least a first seal into an opened end portion of said central open region of said enclosure.

14. The method of claim 11, wherein said at least one spliced fiber cradle further includes a third region configured for holding a tracer wire included with at least one of said first and second fiber optic cables.

* * * * *